US010173085B2

(12) United States Patent
Dehondt (10) Patent No.: US 10,173,085 B2
(45) Date of Patent: Jan. 8, 2019

(54) CARABINER AND SECURING ASSEMBLY FOR A SAFE SECURING SYSTEM (71) Applicant: Thierry Dehondt, Tinqueux (FR)

(72) Inventor: Thierry Dehondt, Tinqueux (FR)

(*) Notice: Subject to any disclaimer, the term of this patent is extended or adjusted under 35 U.S.C. 154(b) by 0 days.

(21) Appl. No.: 15/538,681

(22) PCT Filed: Dec. 14, 2015

(86) PCT No.: PCT/FR2015/053482
§ 371 (c)(1),
(2) Date: Jun. 22, 2017

(87) PCT Pub. No.: WO2016/102807
PCT Pub. Date: Jun. 30, 2016

(65) Prior Publication Data
US 2017/0348555 A1    Dec. 7, 2017

(30) Foreign Application Priority Data
Dec. 22, 2014  (FR) ..................... 14 02984

(51) Int. Cl.
A62B 35/00    (2006.01)
A63B 29/02    (2006.01)
F16B 45/02    (2006.01)

(52) U.S. Cl.
CPC .......... A62B 35/0087 (2013.01); A63B 29/02 (2013.01); F16B 45/02 (2013.01); Y10T 24/45366 (2015.01)

(58) Field of Classification Search
CPC .......... A62B 35/0087; Y10T 24/45366; F16B 45/025; F16B 45/02
See application file for complete search history.

(56) References Cited

U.S. PATENT DOCUMENTS

2013/0213735 A1    8/2013  Dehondt et al.

FOREIGN PATENT DOCUMENTS

EP          2637747 A1    9/2013
FR          2972358 A1    9/2012
WO      2012062987 A1    5/2012

OTHER PUBLICATIONS

International Search Report for PCT/FR2015/053482 dated Mar. 11, 2016.

Primary Examiner — Robert Sandy
Assistant Examiner — Michael S Lee
(74) Attorney, Agent, or Firm — Bachman & LaPointe, P.C.

(57) ABSTRACT

A safety restraint system for a person comprising two carabiners configured to receive at least one restraint element, each of the carabiners comprising a hook for receiving the element, a gate comprising a first branch forming a door and a second branch for actuating the door, a first means for locking the gate in a holding configuration. The system further comprising a transmission device connecting the carabiners together, the device arranged to make it impossible to switch from a state in which each of the carabiners is secured to an element to a state in which neither of the carabiners are secured to an element.

10 Claims, 11 Drawing Sheets

CARABINER AND SECURING ASSEMBLY FOR A SAFE SECURING SYSTEM

BACKGROUND

The invention relates to a safe securing system for a person, a carabiner useable for such a system and an assembly for securing a person comprising such a system.

It is known, in particular from Document EP 2 637 747-A1, to provide a safe securing system for a person, comprising two carabiners intended to receive at least one securing element, each of said carabiners comprising:
- a hook for receiving said securing element, said hook being generally in an inverted J-shape when seen from the side, the ascender of the J forming a lower gripping part and the curved part of the J forming an upper reception part for receiving said securing element, said upper reception part including an opening so that said securing element can pass into it,
- a gate—particularly a generally V-shaped gate—comprising a first branch forming a door and a second branch that activates said door, said gate being mounted on said hook at the intersection between said first and second branches, said gate being free to rotate about a rotation axis located between said lower gripping part and said upper reception part, said gate being moveable into:
    Firstly, an angular reception configuration for receiving said securing element between said first and second branches, in which said opening is closed off by said second branch, and wherein said first branch can be closed by applying an upwards pressure (particularly by said element) on said second branch, and
    Secondly, an angular retaining configuration for retaining said securing element inside said upper reception part between said first and second branches, in which said opening is closed off by said first branch,
- a first means for locking said gate in the angular retaining configuration,
- a transmission device connecting said carabiners to each other, said device being arranged to ensure that at least one carabiner is always secured to a securing element.

The securing element may for example be a cable, a ladder rung or a scaffolding bar.

Such a system is integrated particularly into an assembly also including a harness for securing a person, the carabiners being attached to said harness by straps or ropes.

Such a system can be used particularly to secure site operators working at a height or persons performing "via ferrata" (climbing path) or tree-to-tree activities.

The fact of having two carabiners connected by the transmission device enables the user to change from one securing element to another while remaining in a safe condition, since he or she is always in a situation in which at least one of the carabiners is attached to a securing element.

In construction activities, the securing element is often a scaffolding bar or a metal angle or a similar metal element that consequently has a large cross-sectional dimension—for example a diameter of between 50 and 70 mm.

In order to achieve optimal ergonomics, it is essential that a carabiner does not have any projection that could hinder its attachment when it is moved in translation downwards, therefore along a vertical direction or a direction with a vertical component.

However, when the carabiner is intended to be secured to a securing element with a large cross-section, a large opening and therefore a door with a corresponding size are essential.

Consequently, when the gate is in the reception configuration, the door can form a projection that may hinder the securing of the carabiner on the securing element.

The purpose of the invention is to mitigate this disadvantage.

SUMMARY

To that effect, a first aspect of the invention discloses a safe securing system for a person, comprising two carabiners intended to receive at least one securing element, each of said carabiners comprising:
- a hook for receiving said element, said hook being generally in an inverted J-shape when seen from the side, the ascender of the J forming a lower gripping part and the curved part of the J forming an upper reception part for receiving said securing element, said upper reception part including an opening so that said securing element can pass into it, a gate—particularly a generally V-shaped gate—comprising a first branch forming a door and a second branch that activates said door, said gate being mounted on said hook at the intersection between said first and second branches, said gate being free to rotate about a rotation axis located between said lower gripping part and said upper reception part, said gate being moveable into:
    Firstly, an angular reception configuration for receiving said securing element between said first and second branches, in which said opening is closed off by said second branch, and wherein said first branch can be closed by applying an upwards pressure (particularly by said element) on said second branch; and
    Secondly, an angular retaining configuration for retaining said securing element inside said upper reception part between said first and second branches, in which said opening is closed off by said first branch,
- a first means of locking said gate in the angular retaining configuration,
- a transmission device connecting said carabiners to each other, and comprising two cables (14) each sliding in a sheath, each of said cables being connected:
    on one side, to a gate (10), at a distance from its rotation axis (12);
    on the other side, to the first means for locking the other gate (10),
- such that placing a gate (10) in the angular retaining configuration causes deactivation of the first means for locking the other gate (10), whereas placing a gate (10) in the angular reception configuration causes activation of the first means for locking the other gate (10), so as to ensure that at least one carabiner (2) is always secured to a securing element (3), said lower gripping part comprising for each carabiner a reception face facing said first branch when said gate is in its angular reception configuration, said reception face extending over all or some of the height of said lower gripping part.

Note that throughout this description, unless mentioned otherwise, positioning terms in space (upper, lower, under, bottom, top, vertical, horizontal, etc.) are considered with reference to a carabiner in its normal working situation, its lower gripping part extending vertically.

When it is said that the transmission device is arranged to ensure that at least one carabiner is always secured to a securing element, reference is made to normal conditions of use of the system, in other words without using a tool or a complex manoeuvre in order to achieve emergency unlocking.

Indeed, in some systems it is possible to unlock one carabiner although the other carabiner is not secured, said unlocking making use of a tool or activation of an access device that is not practical for the user's hand.

With the proposed arrangement, there is a system in which there are no projecting parts from the carabiners that could hinder their securing manoeuvre by downwards translation, therefore along a vertical direction or including a vertical component, for example inclined at the order 45° from the vertical.

Indeed, the invention takes advantage of the fact that the gripping part is wide (particularly corresponding to the width of a hand) to bring the door (that is also wide) facing said part, such that said door does not form a projection that hinders the securing of the carabiner when the gate is in the angular reception configuration.

A second aspect of the invention relates to a carabiner that can be used for such a system.

A third aspect of the invention discloses an assembly for securing a person comprising such a system.

BRIEF DESCRIPTION OF THE DRAWINGS

Other special features and advantages of the invention will become clear after reading the following description given with reference to the appended figures in which.

DETAILED DESCRIPTION

A safe securing system 1 for a person is described with reference to the figures, comprising two carabiners 2 intended to receive at least one securing element 3, each of said carabiners comprising:
  a hook 4 for receiving said securing element, said hook being generally in an inverted J-shape when seen from the side, the ascender of the J forming a lower gripping part 7 and the curved part of the J forming an upper reception part 5 for receiving said securing element, said upper reception part including an opening 6 so that said securing element can pass into it,
  a gate 10 (particularly a generally V-shaped gate) comprising a first branch forming a door 8 and a second branch 11 that activates said door, said gate being mounted on said hook at the intersection between said first and second branches, said gate being free to rotate about a rotation axis 12 located between said lower gripping part and said upper reception part, said gate being movable into:
    Firstly, an angular reception configuration for receiving said element between said first and second branches, in which said opening is closed off by said second branch, and wherein said first branch can be closed by applying an upwards pressure (particularly by said securing element) on said second branch; and
    Secondly, an angular retaining configuration for retaining said securing element inside said upper reception part between said first and second branches, in which said opening is closed off by said first branch,
  a first means for locking said gate in the angular retaining configuration,
  a transmission device 9 connecting said carabiners to each other, said transmission device being arranged to ensure that at least one carabiner 2 is always secured to a securing element 3,
said lower gripping part comprising a reception face 31 facing said first branch when said gate is in its angular reception configuration, said reception face extending over all of the height or some of the height of said lower gripping part.

Figure 3A:
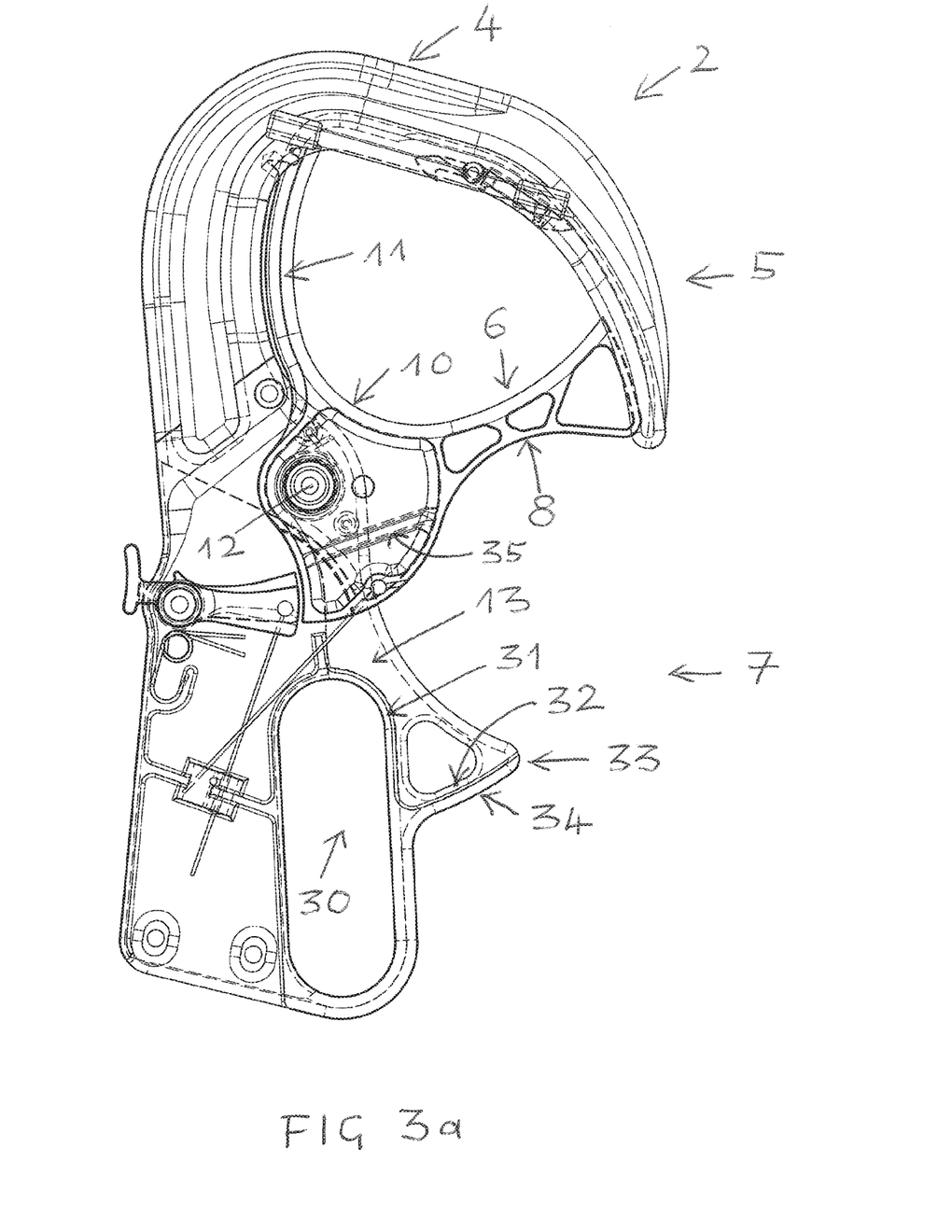
FIGS. 3a and 3b are diagrammatic side views of another embodiment of a carabiner, with the first branch closed (FIG. 3a) and open (FIG. 3b).
Figure 3B:
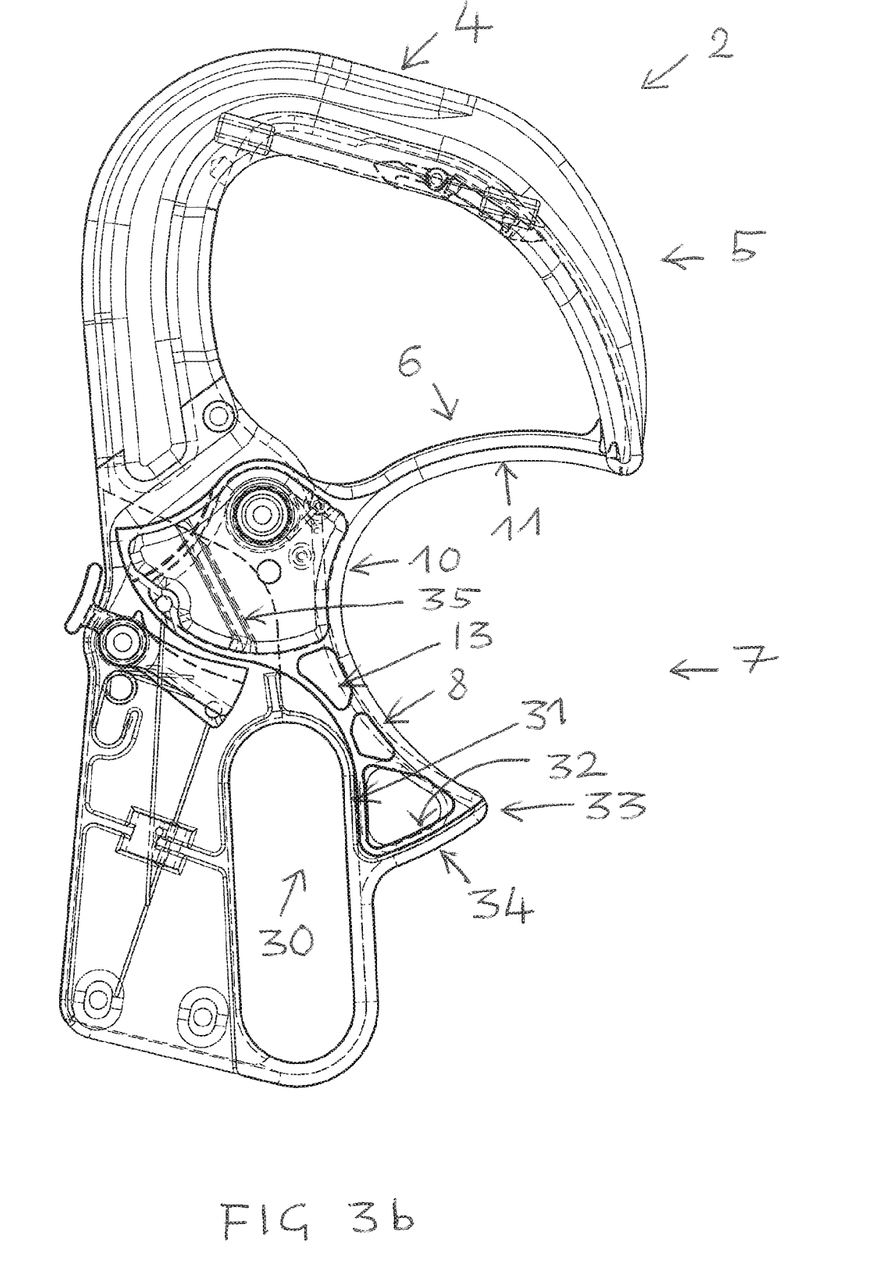

According to the embodiment shown in FIG. 3, the lower gripping part 7 is provided with an orifice 30 into which a user's hand will fit.

With such an arrangement, the user's hand does not interfere with the first branch 8, when it extends in front of the reception face 31, when the gate 10 is rotated towards its retaining configuration.

Furthermore, the presence of such an orifice 30 enables the user to optimise his or her grip on the carabiner 2 making it possible to hang from a securing element 3.

Finally, such an orifice 30 provides protection for the user's fingers.

A protection cover (not shown) can be provided extending laterally from the orifice 30 to surround at least a part of the user's fingers not protected by the walls of said orifice.

The protection cover can be in the form of a part associated with the hook 4, for example attached by screws, said part particularly being made of a moulded plastic material to be lightweight, or being derived from the material of said hook.

According to the embodiments shown in FIGS. 2 and 3, when the first branch 8 extends facing the reception face 31, said first branch is at least partially inserted in a complementary shaped housing 13 formed in the lower gripping part 7.

In the embodiments shown, the housing 13 is in the form of a cavity.

In one variant not shown, the housing 13 is in the form of a recess that opens up laterally on each side of the wall 32.

In the embodiment shown in FIG. 3, the housing 13 is in the form of a cavity delimited partly by the reception face 31 and by a wall 32 integrated into a projection 33 located at the bottom of said reception face.

According to the embodiment shown in FIG. 3, the first branch 8 is entirely inserted into the cavity such that said first branch does not form a projection that would hinder the securing of the carabiner 2.

According to the embodiment shown in FIG. 3, the projection 33 includes an inclined face 34 designed to guide the securing element 3 between the first 8 and second 11 branches of the gate 10 in the angular reception configuration when the carabiner 2 is positioned above said securing element.

Thus, the projection 33 does not at all hinder maneuvers to insert a securing element 3 into a carabiner 2.

It can be seen that with the embodiment shown in FIG. 3, a securing element 3 can be inserted along a direction inclined at about 45° from the vertical, while with the embodiment in FIG. 2 a securing element 3 can be inserted along an approximately vertical direction.

Figure 2A:
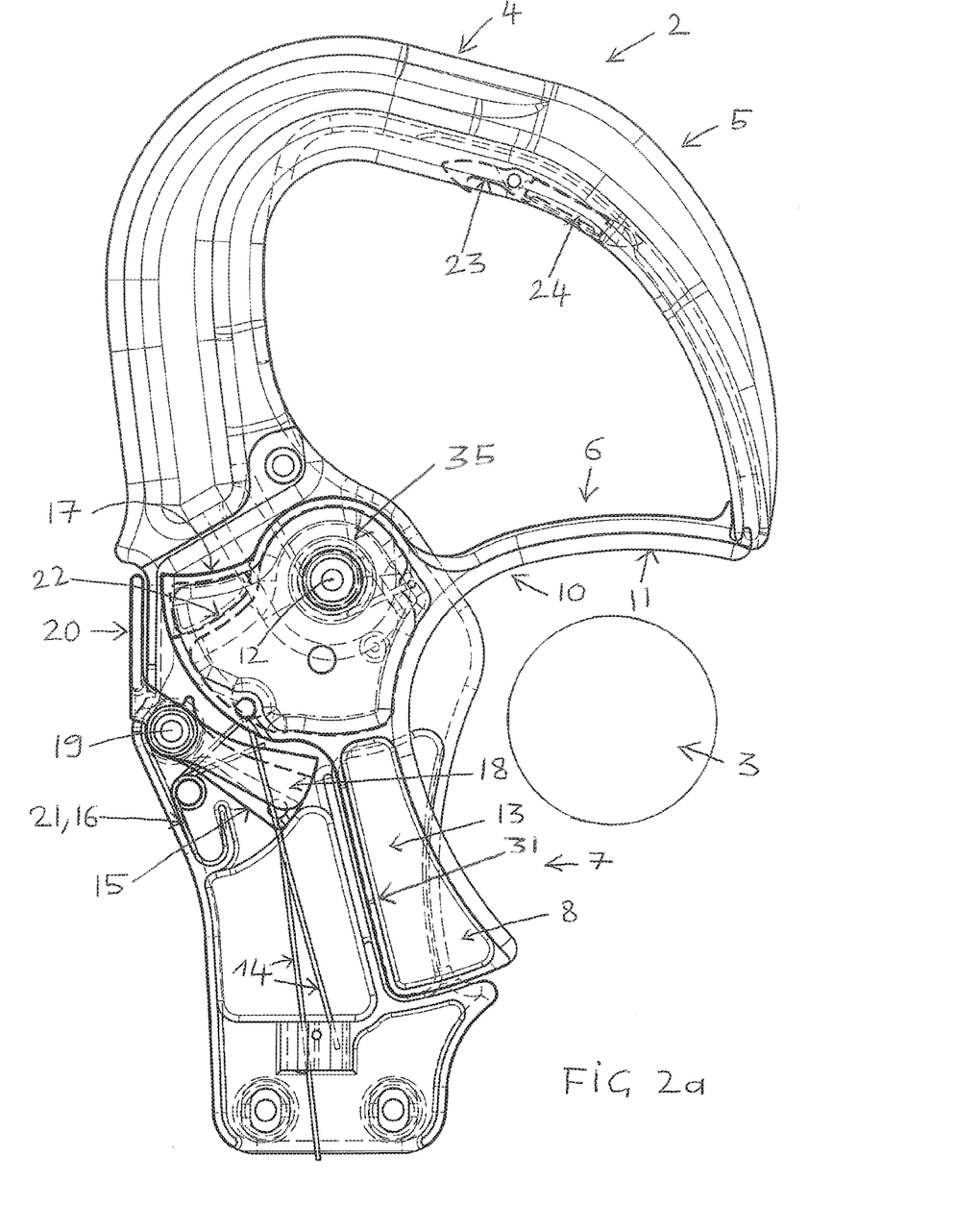
FIGS. 2a to 2h are transparent side views of a carabiner according to one embodiment, and a securing element, the first branch of said carabiner being shown:
  open (FIG. 2a),
  during its closing with the lock in the locked position (FIG. 2b) and in the release position (FIG. 2c),
  closed with the first and second latches in the locked position (FIG. 2d),
  closed with the first latch in the locked position and the second latch in the unlocked position (FIGS. 2e, 2f in which the gate that has turned to its angular reception configuration is blocked in rotation because the first latch is locked),
  closed with the first and second latches in the unlocked position (FIG. 2g),
  closed with the first latch in the unlocked position and the second latch in the locked position (FIG. 2h.
Figure 2B:
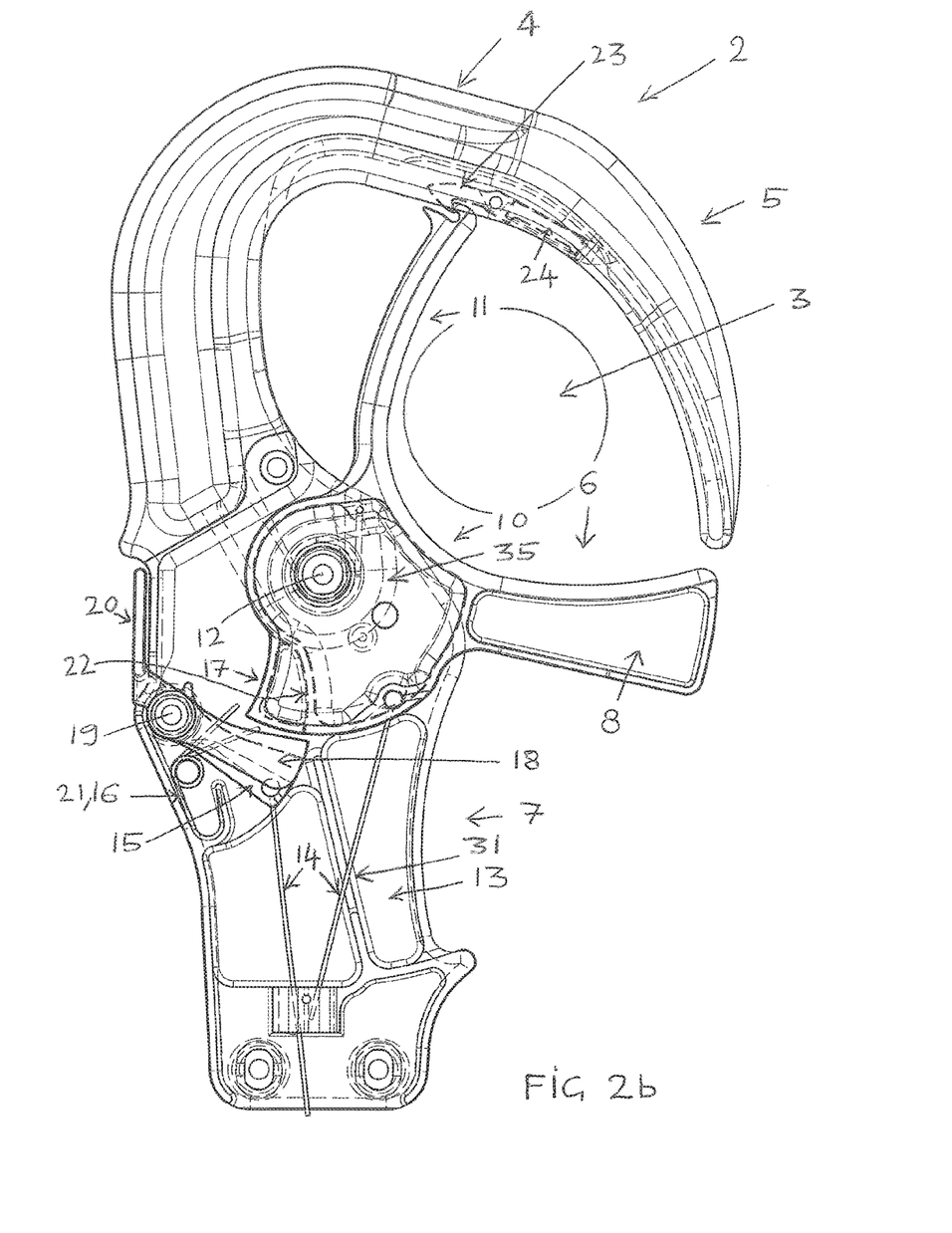
Figure 2C:
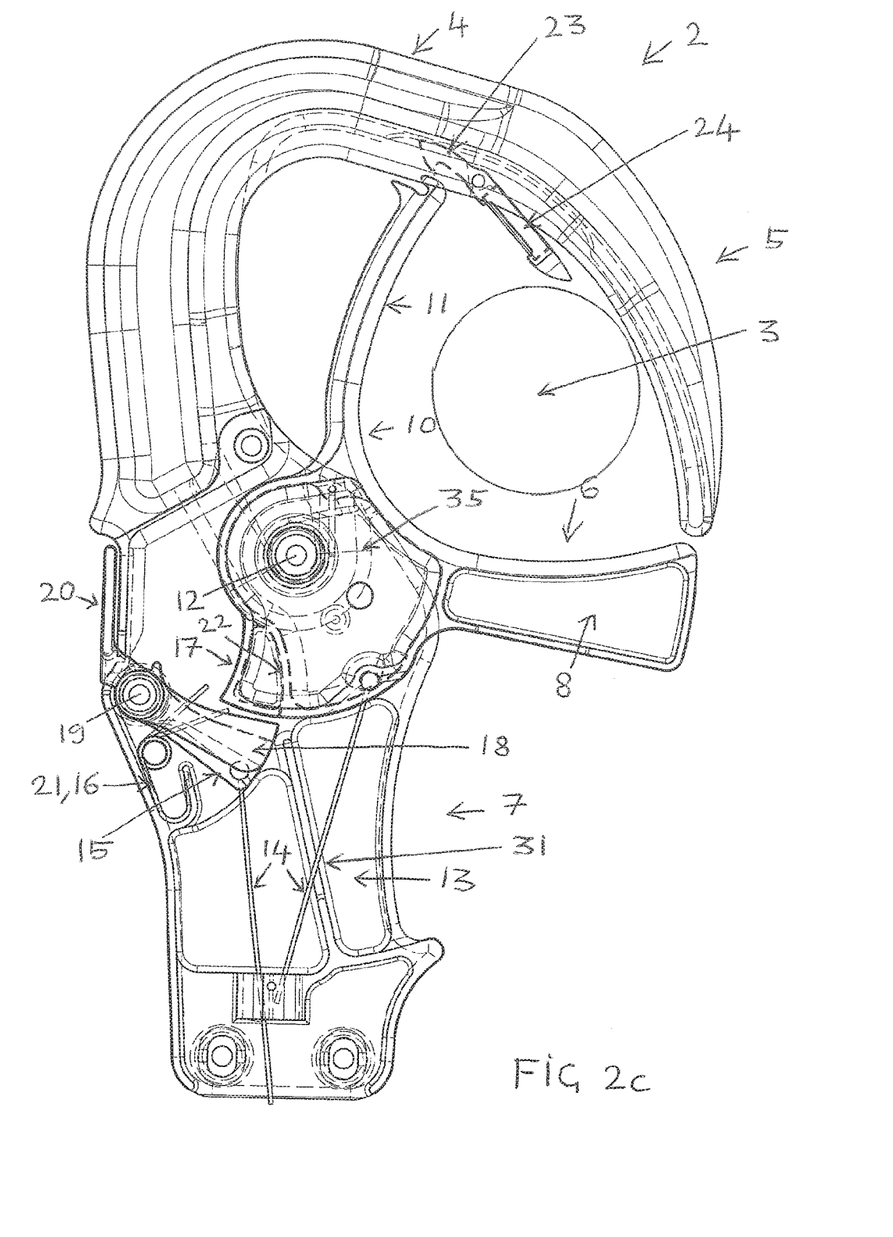
Figure 2D:
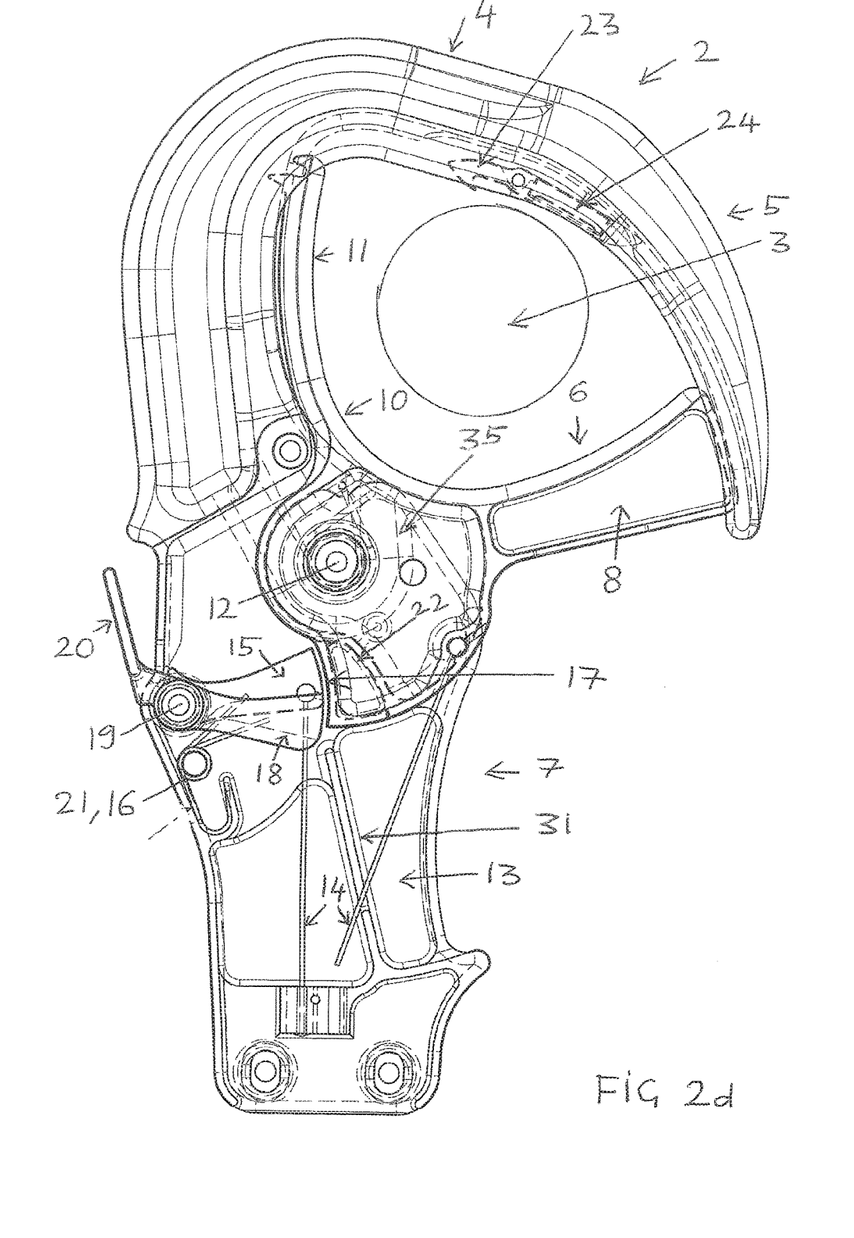
Figure 2E:
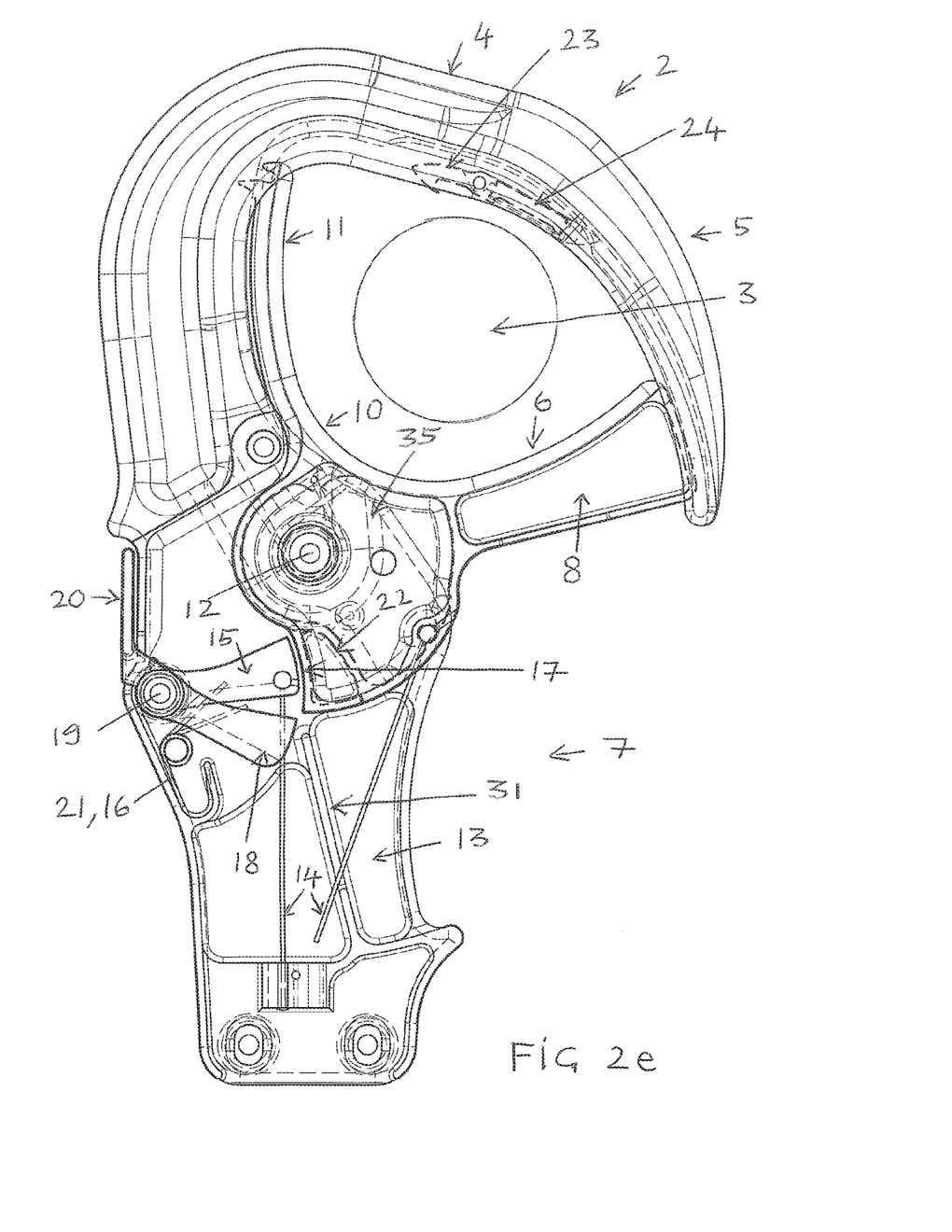
Figure 2F:
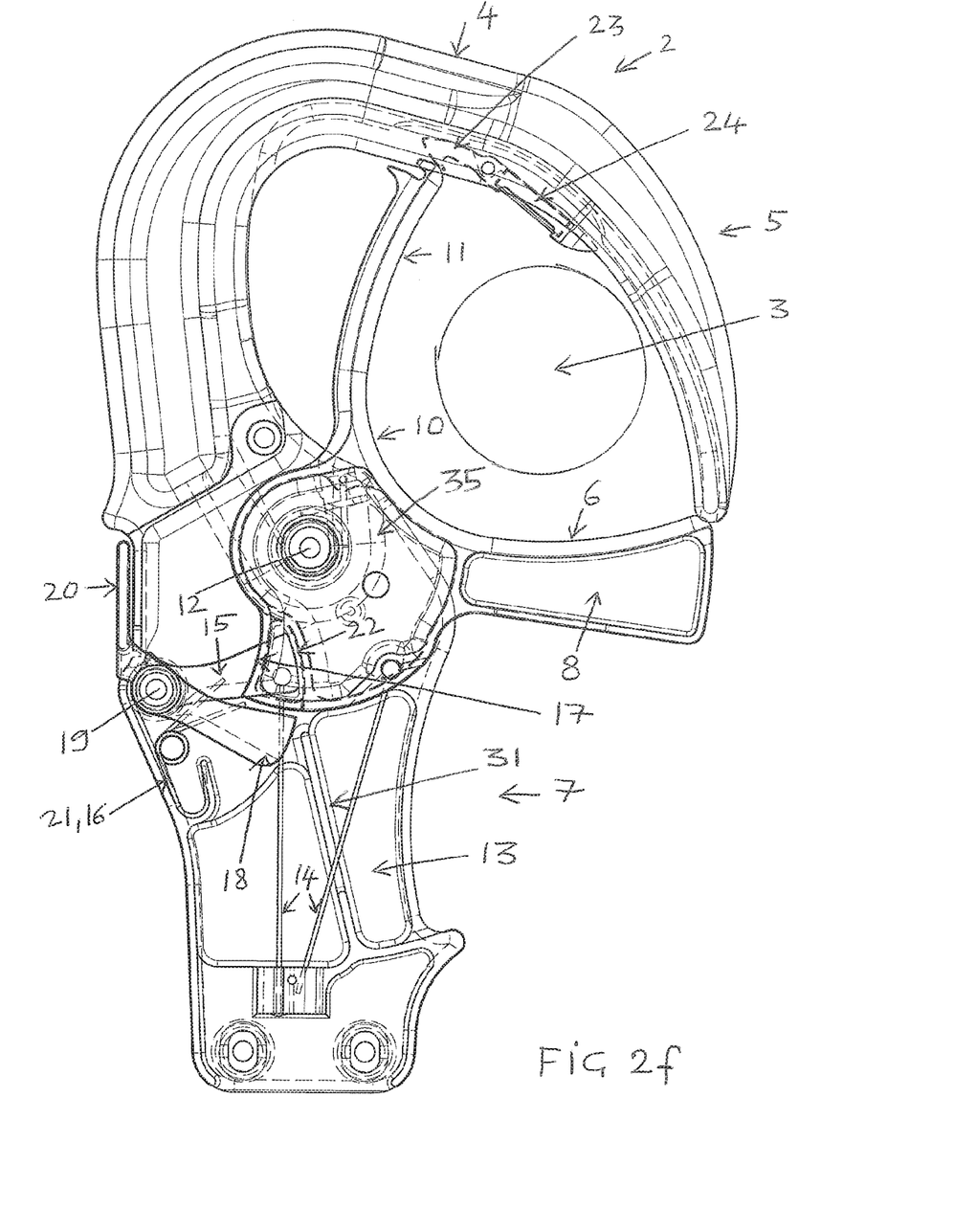
Figure 2G:
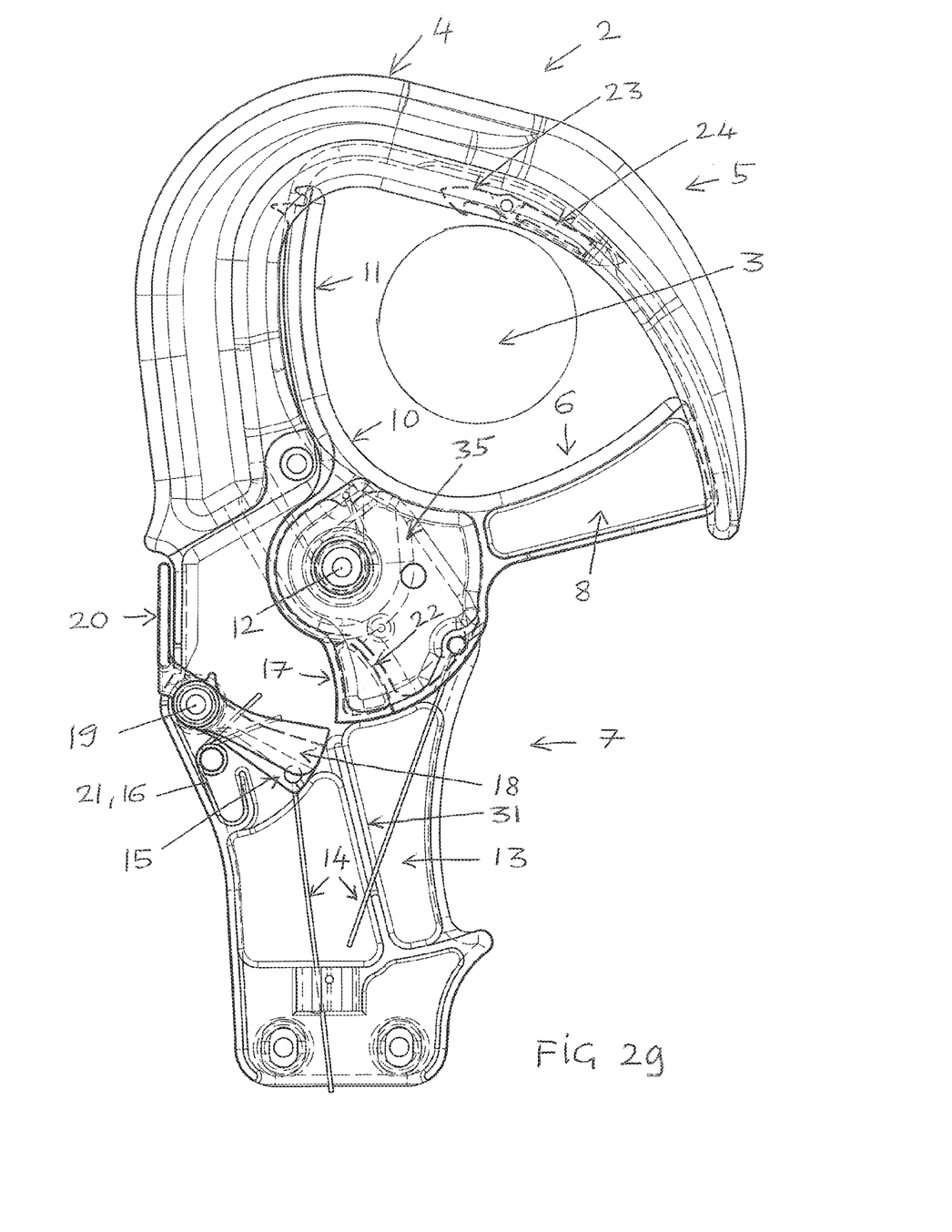
Figure 2H:
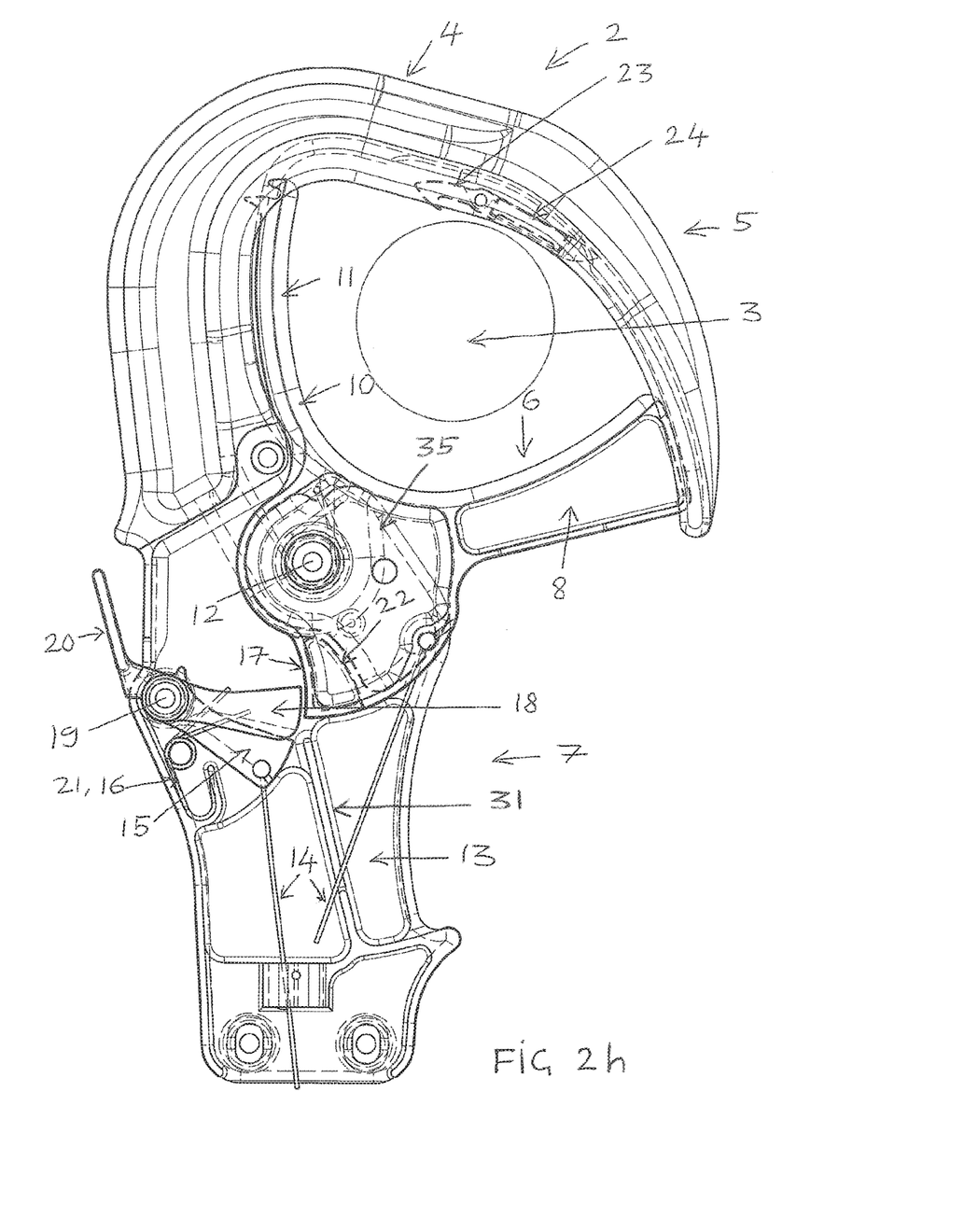

With the embodiments shown, the transmission device 9 comprises two cables 14 each sliding in a sheath not shown, usually called "Bowden cables", each of said cables being connected:
- on one side, to a gate 10, at a distance from its rotation axis 12,
- on the other side, to the first means for locking the other gate 10,
- such that placing a gate 10 in the angular retaining configuration (FIGS. 2d to 2h) causes deactivation of the first means for locking the other gate 10 (FIGS. 2g, 2h), whereas placing a gate 10 in the angular reception configuration (FIG. 2) causes activation of the first locking means for locking the other gate 10 (FIGS. 2d to 2f).

According to the embodiments shown, the first locking means comprises:
- a first latch 15 fitted in rotation on the hook 4 between a locked position (FIGS. 2d to 2f) and an unlocked position (FIGS. 2g, 2h),
- a first spring 16 for moving said first latch to the locked position,
- a first tooth 22 located on said gate, to contain said first latch in the locked position.

According to the embodiments shown, placing a gate 10 in the angular reception configuration applies a tension on the corresponding cable 14, the effect of said tension being to release the first latch 15 from the first tooth 22 on the other gate 10.

According to the embodiments shown, the system 1 also includes a second locking means, said second locking means comprising:
- a second latch 18 mounted in rotation about the rotation axis 19 of the first latch 15 between a locked position (FIGS. 2d and 2h) and an unlocked position (FIGS. 2e to 2g), said second latch having a zone 20 for allowing the user to move said second latch to the unlocked position (in this case by pressing it),
- a second spring 21 (in this case taken from the first spring 16 that is based on metal wire comprising two tabs separated by a spiral, each of said tabs bearing on a latch 15, 18 respectively) for moving said second latch to the locked position,
- a second tooth 17 (in this case offset axially and angularly relative to the first tooth 22) for holding said second latch in the locked position.

The presence of the second locking means obliges the user to perform a voluntary manoeuvre to detach a carabiner 2 from a securing element 3.

According to the embodiments shown, a carabiner 2 also comprises a spring 35 for moving the gate 10 to the angular reception configuration.

Opening of the first branch 8 is thus assisted, that facilitates removal of a securing element 3 from the carabiner 2.

According to one embodiment, the system 1 comprises a device for guaranteeing that a carabiner 2 will be attached to a securing element 3, said guaranteeing device including:
- a lock 23 mounted (in this case in rotation) on the reception part 5 and moveable between a locked position (FIG. 2b) for preventing the gate 10 to move to said angular retaining configuration and a release position (FIG. 2c) allowing said gate to move to said angular retaining configuration,
- a third spring, not shown, for moving said lock to the locked position,
- a magnet 24 mounted on said lock to move said lock to the release position when a material that can be attracted by a magnet (said material forming particularly a part of a securing element 3) is placed below said lock.

There is thus a safety device that prevents the securing of a carabiner 2 on a securing element 3 that is not made of a material (metallic in that case) that can be attracted by a magnet.

According to one variant embodiment, the system 1 comprises a device for guaranteeing that a carabiner 2 will be attached to a securing element 3, said guaranteeing device including:
- a lock 23 mounted (in this case in rotation) on the upper reception part 5 and moveable between a locked position (FIG. 2b) for preventing the gate 10 to move to the angular retaining configuration and a release position (FIG. 2c) for allowing said gate to move to said angular retaining configuration, a third spring, not shown, for moving said lock to the locked position,
- a component 24 made of a material that can be attracted by a magnet, said component being mounted on said lock to enable said lock to move to the release position when a magnet is located below said lock,
- a magnet, not shown, intended to be mounted on a securing element 3 to enable said lock to move to the release position when said magnet is located below said lock.

There is thus a safety device that prevents the securing of a carabiner 2 on a securing element 3 that has not been identified as suitable for such a securing, a securing element 3 being fitted with a magnet facing which said carabiner 2 must be placed to that it can be secured.

We will now describe a carabiner 2 that can be used for such a system, said carabiner comprising:
- a hook 4 for receiving a securing element 3, said hook being generally in an inverted J-shape when seen from the side, the ascender of the J forming a lower gripping part 7 and the curved part of the J forming an upper reception part 5 for receiving said securing element, said upper reception part including an opening 6 so that said securing element can pass into it,
- a gate 10—particularly a generally V-shaped gate—comprising a first branch forming a door 8 and a second branch 11 that activates said door, said gate being mounted on said hook at the intersection between said first and second branches, said gate being free to rotate about a rotation axis 12 located between said lower gripping part and said upper reception part, said gate being moveable into:
    Firstly, an angular reception configuration for receiving said securing element between said first and second branches, in which said opening is closed off by said second branch and wherein said first branch can be closed by applying an upwards pressure (particularly by said securing element) on said second branch; and Secondly, an angular retaining configuration for retaining said securing element inside said upper reception part between said first and second branches, in which said opening is closed off by said first branch,
a first means for locking said gate in the angular retaining configuration,
said lower gripping part comprising a reception face 31 facing which said first branch extends when said gate is in the angular reception configuration, said face extending over all or some of the height of said lower gripping part.

According to the embodiments shown in FIGS. 2 and 3, when the first branch 8 extends facing the reception face 31, it is at least partially (FIG. 2) or completely (FIG. 3) inserted in a housing 13 formed in the lower gripping part 7, so as not to inconvenience the user.

According to the embodiment shown in FIG. 3, the gripping part 7 is provided with an orifice 30 into which the user's hand will fit.

With such an arrangement, the user's hand does not interfere with the first branch 8, when it extends in front of the reception face 31, when the gate 10 is rotated towards its angular retaining position.

Furthermore, the presence of such an orifice 30 enables the user to optimise his or her grip on the carabiner 2 making it possible to hang from a securing element 3.

Finally, such an orifice 30 provides protection for the user's fingers.

A protection cover (not shown) can be provided extending laterally from an orifice 30 to surround at least a part of the user's fingers not protected by the walls of said orifice.

The protection cover can be in the form of a part associated with the hook 4, for example attached by screws, said part particularly being made of a moulded plastic material to be lightweight, or being derived from the material of said hook.

In the embodiments shown, the housing 13 is in the form of a cavity.

In one variant not shown, the housing 13 is in the form of a recess that opens up laterally on each side of the wall 31.

In the embodiment shown in FIG. 3, the housing 13 is in the form of a cavity delimited partly by the reception face 31 and by a wall 32 integrated into a projection 33 located at the bottom of said reception face.

According to the embodiment shown in FIG. 3, the first branch 8 is entirely inserted into the cavity such that said first branch does not form a projection that would hinder securing of the carabiner 2.

The projection 33 includes an inclined face 34 designed to guide the securing element 3 between the first and second branches 8, 11 of the gate 10 in the angular reception configuration when the carabiner 2 is positioned above said securing element.

According to the embodiments shown, a carabiner 2 also comprises a spring 35 for moving the gate 10 to the angular reception configuration.

Opening of the door 8 is thus assisted, that facilitates removal of a securing element 3 from the carabiner 2.

Obviously, such a carabiner 2 can be used alone, without being integrated into a system 1 as described above, the planned arrangement making it possible to have a carabiner without a projecting part that could hinder its securing manoeuvre when it is moved in downwards translation.

Note that the orifice 30 described above can also apply to carabiners of types other than that described above.

To achieve this, the invention also relates to a carabiner comprising:

a hook for receiving a securing element, said hook having a gripping part and a reception part for receiving said securing element, said reception part having an opening through which said securing element can pass,
a door for closing said opening,
said gripping part being provided with an orifice into which a user's hand will fit.

Figure 1:
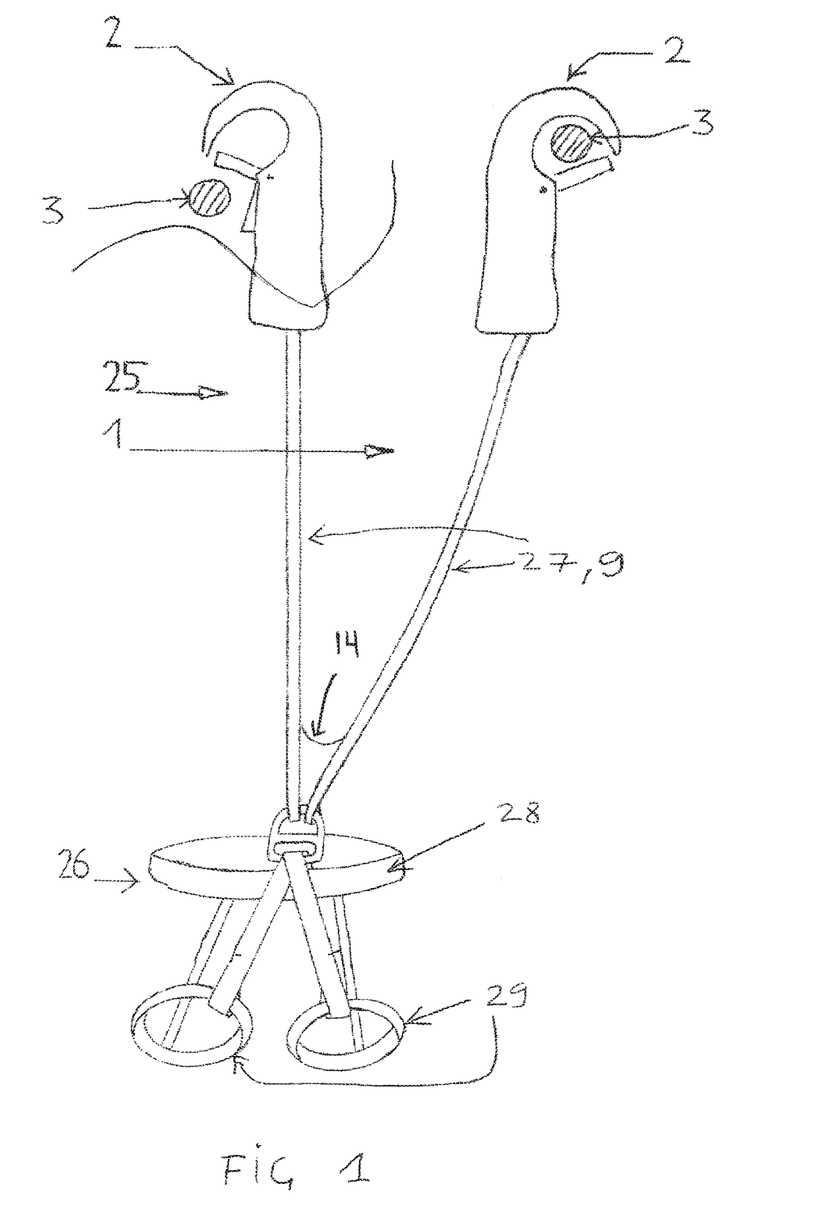
FIG. 1 is a diagrammatic perspective view of an assembly for securing a person comprising a system according to the invention.

Finally, an assembly 25 for securing a person is described comprising such a system 1, said assembly also comprising a harness 26 for securing a user and two straps 27 connecting the carabiners to said harness.

According to the embodiment shown in FIG. 1, the harness comprises a belt 28 and two loops 29 into which the user's thighs fit and an adjustment loop (not shown).

The invention claimed is:

1. A safe securing system for a person, comprising two carabiners configured to receive at least one securing element, each of said carabiners comprising:
   a hook for receiving said securing element, said hook being generally in an inverted J-shape when seen from the side, an ascender of the J forming a lower gripping part and the curved part of the J forming an upper reception part for receiving said securing element, said upper reception part including an opening so that said securing element can pass into said upper reception part,
   a gate comprising a first branch forming a door and a second branch that activates said door, said gate being mounted on said hook at the intersection between said first and second branches, said gate being free to rotate about a rotation axis located between said lower gripping part and said upper reception part, said gate being moveable into:
      firstly, an angular reception configuration for receiving said securing element between said first and second branches, in which said opening is closed off by said second branch, and wherein said first branch can be closed by applying an upwards pressure on said second branch, and;
      secondly, an angular retaining configuration for retaining said securing element inside said upper reception part between said first and second branches, in which said opening is closed off by said first branch,
   a first means for locking said gate in the angular retaining configuration,
   a transmission device connecting said two carabiners to each other and comprising two cables each sliding in a sheath, each of said cables being connected:
      on one side, to the gate of one said two carabiners, at a distance from its rotation axis;
      on the other side, to the first means for locking the other gate,
   such that placing the gate of one said two carabiners in the angular retaining configuration causes deactivation of the first means for locking the other gate, whereas placing the gate of one said two carabiners in the angular reception configuration causes activation of the first means for locking the other gate, so as to ensure that at least one carabiner is secured to a securing element,
said lower gripping part comprising for each carabiner a reception face facing said first branch when said gate is in the angular reception configuration, said reception face extending over all or some of a height of said lower gripping part.

2. The system according to claim 1, wherein the lower gripping part is provided with an orifice configured to fit a user's hand.

3. The system according to claim 2, wherein when the first branch extends facing the reception face, said first branch is at least partially inserted in a complementary shaped housing formed in the lower gripping part.

4. The system according to claim 3, wherein the housing is in the form of a cavity delimited partly by the reception face and by a wall integrated into a projection located at the bottom of said reception face.

5. The system according to claim 4, wherein the projection includes an inclined face designed to guide the securing element between the first and second branches of the gate in the angular reception configuration when the carabiner is positioned above said securing element.

6. The system according to claim 5, wherein the first locking means comprises:
- a first latch fitted in rotation on the hook between a locked position and an unlocked position,
- a first spring configured to move said first latch to the locked position,
- a first tooth located on said gate, configured to contain said first latch in the locked position.

7. The system according to claim 6, wherein the system further comprises a second locking means, said second locking means comprising:
- a second latch mounted in rotation on the hook about the rotation axis of the first latch, between a locked position and an unlocked position, said second latch having a zone for allowing the user to move said second latch to the unlocked position,
- a second spring for moving said second latch to the locked position,
- a second tooth for holding said second latch in the locked position.

8. The system according to claim 7, wherein a carabiner also comprises a spring for moving the gate to the angular reception configuration.

9. The system according to claim 8, wherein the system further comprises a device for guaranteeing that a carabiner will be attached to a securing element, said guaranteeing device including:
- a lock mounted on the reception part and moveable between a locked position for preventing the gate to move to the angular retaining configuration and a release position for allowing said gate to move to said angular retaining configuration,
- a third spring for moving said lock to the locked position, and
- a magnet mounted on said lock to move said lock to the release position when a material that can be attracted by a magnet is placed below said lock.

10. The system according to claim 8, wherein the system further comprises a device for guaranteeing that a carabiner will be attached to a securing element, said guaranteeing device including:
- a lock mounted on the reception part and moveable between a locked position for preventing the gate to move to the angular retaining configuration and a release position for allowing said gate to move to said angular retaining configuration,
- a third spring for moving said lock to the locked position,
- a component made of a material that can be attracted by a magnet, said component being mounted on said lock to enable said lock to move to the release position when a magnet is located below said lock,
- a magnet intended to be mounted on a securing element to enable said lock to move to the release position when said magnet is located below said lock.

* * * * *